(12) United States Patent
Liu et al.

(10) Patent No.: US 11,704,161 B2
(45) Date of Patent: Jul. 18, 2023

(54) METHOD, DEVICE AND COMPUTER PROGRAM PRODUCT FOR PROCESSING COMPUTING JOB

(71) Applicant: EMC IP Holding Company LLC, Hopkinton, MA (US)

(72) Inventors: Jinpeng Liu, Shanghai (CN); Jin Li, Shanghai (CN); Sanping Li, Beijing (CN); Zhen Jia, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 55 days.

(21) Appl. No.: 16/845,692

(22) Filed: Apr. 10, 2020

(65) Prior Publication Data

US 2021/0286654 A1 Sep. 16, 2021

(30) Foreign Application Priority Data

Mar. 13, 2020 (CN) .......................... 202010174699.9

(51) Int. Cl.
*G06F 9/50* (2006.01)
*G06F 9/52* (2006.01)

(52) U.S. Cl.
CPC .............. *G06F 9/5066* (2013.01); *G06F 9/52* (2013.01)

(58) Field of Classification Search
CPC .................................. G06F 9/5066; G06F 9/52
See application file for complete search history.

(56) References Cited

U.S. PATENT DOCUMENTS

| | | | | |
|---|---|---|---|---|
| 2017/0344880 | A1* | 11/2017 | Nekuii | G06F 17/153 |
| 2019/0114535 | A1* | 4/2019 | Ng | G06N 3/0454 |
| 2019/0324810 | A1 | 10/2019 | Zhao et al. | |
| 2019/0340010 | A1* | 11/2019 | Lee | G06N 7/08 |
| 2020/0073702 | A1* | 3/2020 | Han | G06F 17/15 |
| 2020/0342292 | A1* | 10/2020 | Cheng | G06N 3/04 |

(Continued)

OTHER PUBLICATIONS

Exploring Hidden Dimensions in Parallelizing Convolutional Neural Networks Zhihao Jia, Sina Lin, Charles Qi, Alex Aiken (Year: 2018).*

(Continued)

*Primary Examiner* — Emerson C Puente
*Assistant Examiner* — Paul V Mills
(74) *Attorney, Agent, or Firm* — Ryan, Mason & Lewis, LLP

(57) ABSTRACT

A first set of requirements of a first set of computing tasks for computing resources in a computing system is acquired respectively. Based on a determination that the requirement of a computing task in the first set of computing tasks for a computing resource satisfies a resource threshold condition, the computing task is divided into a plurality of sub-tasks. The resource threshold condition describes the threshold of a computing resource provided by a computing device in a plurality of computing devices in the computing system. A merging task for merging a plurality of sub-results of the plurality of sub-tasks into a result of the computing task is generated. Based on other computing tasks than the computing task in the set of computing tasks, the plurality of sub-tasks, and the merging task, a second set of computing tasks of the computing job is determined so as to process the computing job.

17 Claims, 9 Drawing Sheets

(56) References Cited

U.S. PATENT DOCUMENTS

2022/0043688 A1* 2/2022 Lai .................... G06F 9/5055

OTHER PUBLICATIONS

Parallel Deep Convolutional Neural Network Training by Exploiting the Overlapping of Computation and Communication Sunwoo Lee, Dipendra Jha, Ankit Agrawal, Alok Choudhary, and Wei-keng Liao (Year: 2017).*
Serving Deep Neural Networks at the Cloud Edge for Vision Applications on Mobile Platforms Zhou Fang, Dezhi Hong, Rajesh K. Gupta (Year: 2019).*
A two-level real-time vision machine combining coarse- and fine-grained parallelism Lars Baunegaard, Anders Kjær-Nielsen, Karl Pauwels, Jeppe Jessen, Marc Van Hulle (Year: 2010).*
A Temporal Dependency Aware Approach for Scheduling Real-time Tasks on Multi-core Platforms Zijun Han, Guangzhi Qu, Bo Liu, Feng Zhang (Year: 2019).*
Deconvolution of Huge 3-D Images: Parallelization Strategies on a Multi-GPU System Pavel Karas, Michal Kuderjavy, and David Svoboda (Year: 2013).*
A Bi-layered Parallel Training Architecture for Large-Scale Convolutional Neural Networks Jianguo Chen, Kenli Li, Kashif Bilal, Xu Zhou, Keqin Li, and Philip Yu (Year: 2019).*
Algorithms for Efficient Computation of Convolution Karas Pavel and Svoboda David Design and Architectures for Digital Signal Processing, Chapter 8 (Year: 2013).*
Large Scale Distributed Deep Networks Jeffrey Dean, Greg S. Corrado, Rajat Monga, Kai Chen, Matthieu Devin, Quoc V. Le, Mark Z. Mao, Marc'Aurelio Ranzato, et al. (Year: 2012).*
A New Approach to Compute CNNs for Extremely Large Images Sai Wu, Mengdan Zhang, Gang Chen (Year: 2017).*
Crossbow: Scaling Deep Learning with Small Batch Sizes on Multi-GPU Servers Alexandros Koliousis, Pijika Watcharapichat, Matthias Weidlich (Year: 2019).*
Wikipedia, "Intermediate Representation," https://en.wikipedia.org/w/index.php?title=Intermediate_representation&direction=next&oldid=905361000, Jan. 24, 2020, 4 pages.
Jia et al., "Beyond Data and Model Parallelism for Deep Neural Networks," Proceedings of the 2nd SysML Conference, Palo Alto, CA, Jul. 2018, 13 pages.
Wikipedia, "Deep Learning," https://en.wikipedia.org/wiki/Deep_learning, Feb. 6, 2020, 33 pages.
Wikipedia, "Everything as a Service," https://simple.wikipedia.org/wiki/Everything_as_a_service, Aug. 23, 2019, 2 pages.
L. Song et al., "HyPar: Towards Hybrid Parallelism for Deep Learning Accelerator Array," arXiv:1901.02067v1, Jan. 7, 2019, 13 pages.
U.S. Appl. No. 16/540,385 filed in the name of Jinpeng Liu et al. on Aug. 14, 2019, and entitled "Method, a Device and a Computer Program Product for Determining a Resource Required for Executing a Code Segment.".
U.S. Appl. No. 16/542,757 filed in the name of Jinpeng Liu et al. on Aug. 16, 2019, and entitled "Method, Device and Computer Program Product for Processing Machine Learning Model.".
U.S. Appl. No. 16/678,758 filed in the name of Jinpeng Liu et al. on Nov. 8, 2019, and entitled "Method, Electronic Device and Computer Program Product for Processing Machine Learning Model.".
U.S. Appl. No. 16/789,006 filed in the name of Jin Li et al. on Feb. 12, 2020, and entitled "Scheduling Artificial Intelligence Model Partitions Based on Reversed Computation Graph.".
U.S. Appl. No. 16/823,445 filed in the name of Jinpeng Liu et al. on Mar. 19, 2020, and entitled "Task Scheduling Method, Electronic Device, and Computer Storage Medium."

* cited by examiner

METHOD, DEVICE AND COMPUTER PROGRAM PRODUCT FOR PROCESSING COMPUTING JOB

RELATED APPLICATION(S)

The present application claims priority to Chinese Patent Application No. 202010174699.9, filed Mar. 13, 2020, and entitled "Method, Device and Computer Program Product for Processing Computing Job," which is incorporated by reference herein in its entirety.

FIELD

Implementations of the present disclosure relate to the management of computing jobs, and more particularly, to a method, a device, and a computer program product for processing an artificial intelligence model-based computing job.

BACKGROUND

Artificial intelligence (AI) (for example, machine learning (ML), deep learning (DL), and data mining (DM)) technologies have been widely developed, and a large number of artificial intelligence applications have been used in a variety of application fields. These applications can utilize various resources, such as processing and storage resources, to complete various computing jobs.

Due to high and increasing complexity of artificial intelligence jobs, a large and/or variable number of dedicated processing resources are required to ensure the normal operation of corresponding computing jobs. For example, cloud-based computing systems have been developed, and such a computing system may comprise a machine (e.g., a server) with one or more dedicated processing resources. In this computing system, different clients can use (e.g., lease) dedicated resources in the computing system as needed to execute their respective computing jobs. However, due to large differences between amounts of computation involved in the computing jobs, it is difficult to effectively use the computing resources in the computing system, and there may sometimes be situations where a computing device is unable to provide sufficient computing resources required by one computing job. Therefore, how to manage computing jobs in a more effective manner has become a hot topic of research.

SUMMARY

Therefore, it is desirable to develop and implement a technical solution for processing a computing job in a more effective manner. It is expected that the technical solution can be compatible with existing computing systems, and a computing job can be processed in a more effective manner by modifying various configurations of the existing computing systems.

According to a first aspect of the present disclosure, a method for processing a computing job is provided, the computing job comprising a first set of computing tasks. In this method, a first set of requirements of the first set of computing tasks for computing resources in a computing system is acquired respectively. Based on a determination that the requirement of a computing task in the first set of computing tasks for a computing resource satisfies a resource threshold condition, the computing task is divided into a plurality of sub-tasks. The resource threshold condition describes the threshold of a computing resource provided by a computing device in a plurality of computing devices in the computing system. A merging task for merging a plurality of sub-results of the plurality of sub-tasks into a result of the computing task is generated. Based on other computing tasks than the computing task in the set of computing tasks, the plurality of sub-tasks, and the merging task, a second set of computing tasks of the computing job is determined so as to process the computing job.

According to a second aspect of the present disclosure, an electronic device is provided, which comprises: at least one processor; and a memory coupled to the at least one processor and having instructions stored therein, wherein the instructions, when executed by the at least one processor, cause the device to perform actions for processing a computing job in an application system. The computing job comprises a first set of computing tasks. The actions comprise: acquiring a first set of requirements of the first set of computing tasks for computing resources in a computing system, respectively; dividing, based on a determination that the requirement of a computing task in the first set of computing tasks for a computing resource satisfies a resource threshold condition, the computing task into a plurality of sub-tasks, the resource threshold condition describing the threshold of a computing resource provided by a computing device in a plurality of computing devices in the computing system; generating a merging task for merging a plurality of sub-results of the plurality of sub-tasks into a result of the computing task; and determining, based on other computing tasks than the computing task in the set of computing tasks, the plurality of sub-tasks, and the merging task, a second set of computing tasks for the computing job so as to process the computing job.

According to a third aspect of the present disclosure, a computer program product is provided. The computer program product is tangibly stored in a non-transitory computer-readable medium and comprises machine-executable instructions that are used for performing the method according to the first aspect of the present disclosure.

BRIEF DESCRIPTION OF THE DRAWINGS

In combination with the accompanying drawings and with reference to the following detailed description, the features, advantages, and other aspects of the implementations of the present disclosure will become more apparent, and several implementations of the present disclosure are illustrated herein by way of example but not limitation. In the accompanying drawings.

DETAILED DESCRIPTION

Figure 1:
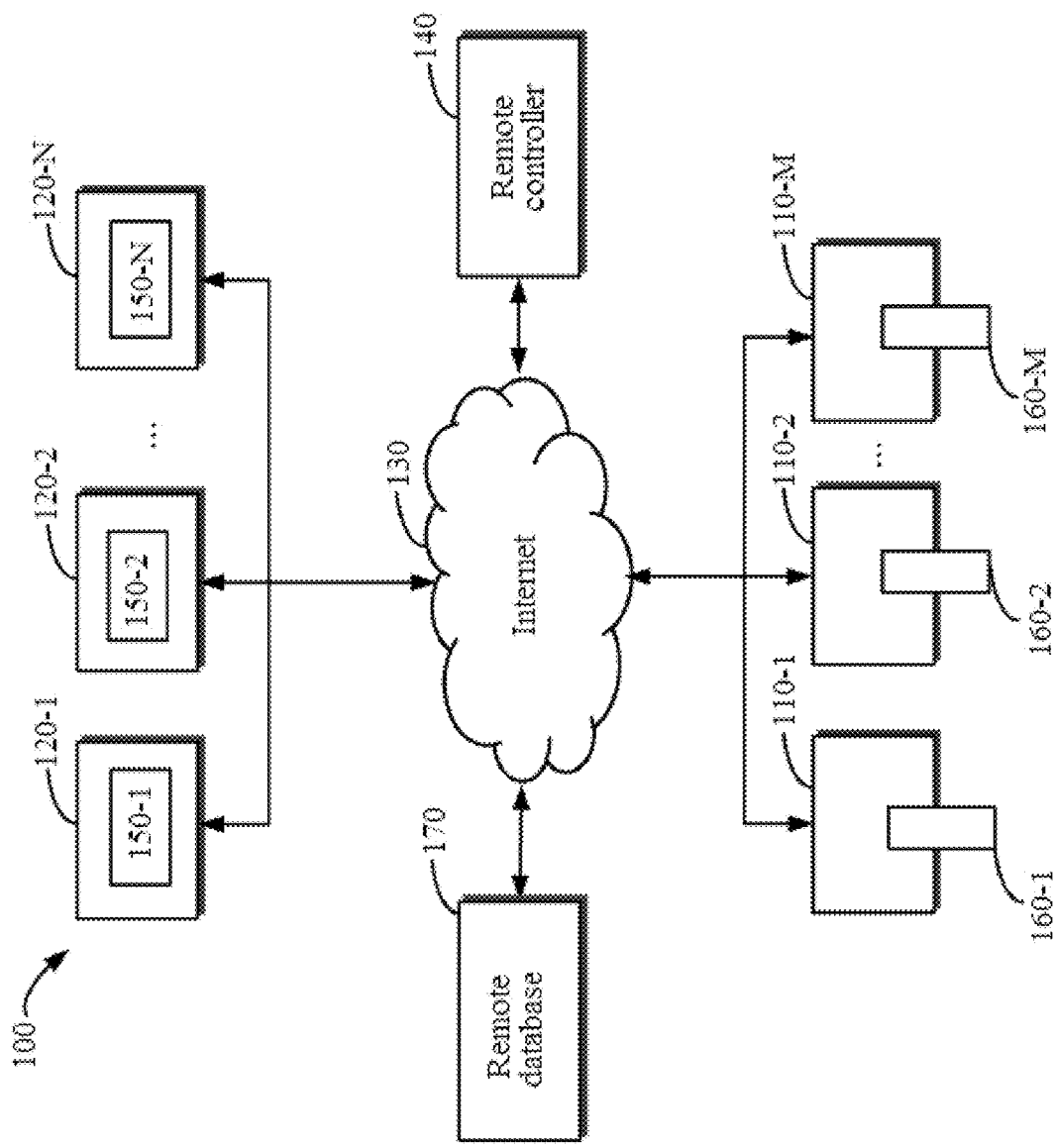
FIG. 1 schematically shows a block diagram of a computing system in which a schematic implementation of the present disclosure can be implemented.

Hereinafter, illustrative implementations of the present disclosure will be described in more detail with reference to the accompanying drawings. Although illustrative implementations of the present disclosure are shown in the accompanying drawings, it should be understood that the present disclosure can be implemented in various forms and should not be limited by the implementations set forth herein. But rather, these implementations are provided so that the present disclosure will be more thorough and complete, and the scope of the present disclosure can be fully conveyed to those skilled in the art.

As used herein, the term "include" and variations thereof mean open inclusion, i.e., "including but not limited to." Unless specifically stated, the term "or" means "and/or." The term "based on" means "based at least in part on." The terms "one example implementation" and "one implementation" mean "at least one example implementation." The term "another implementation" means "at least one additional implementation." The terms "first," "second," etc. may refer to different or identical objects. Other explicit and implicit definitions may also be included below.

It will be understood that different computing jobs involve different amounts of computation, which results in the need for different quantities of computing resources. For example, one computing job may require hundreds of MB of memory resources and thousands of threads, while another computing job may require only tens of MB of memory resources and hundreds of threads. When the required computing resources are higher than the upper limit of resources provided by a computing device, the computing device has to spend extra overhead to perform resource scheduling. For example, for a computing job with large memory requirements, if a computing device in a computing system cannot provide a sufficient memory space, it will result in frequent exchange of data between a memory and a storage device. This will greatly affect the performance of processing the computing job.

For convenience of description, in the context of the present disclosure, various example implementations of the present disclosure will be described in an application environment of an artificial intelligence technology. In the field of artificial intelligence, resources (for example, computing resources and storage resources) of a dedicated processing unit (for example, a graphics processing unit (GPU)) can be utilized to process computing jobs. Since there are upper limits for both the number (of threads) of dedicated processing units and memory space in a computing device, it should be determined, during the processing and analysis of a job, whether the dedicated processing units can provide sufficient computing resources to the computing job.

An artificial intelligence-based computing job is essentially a program that can include one or more functions implemented by code segments. Similar to the execution of normal programs, a compiler is needed to compile the program when the artificial intelligence-based computing job is performed. In modern compiler design and implementation, a compiler (for example, GCC and LLVM) for normal programs (for example, C/C++ or FORTRAN) is usually divided into two parts: front-end and back-end. The front-end takes a source program as input and translates it into a hardware-independent intermediate representation. The intermediate representation is another program written in another language used inside the compiler, while it is easy to be optimized and easy to be translated into machine code. Thereafter, the back-end compiles and optimizes the intermediate representation program into a binary executable file which contains code of a machine (e.g., X86, Power, or ARM) of a target central processing unit.

For the development of artificial intelligence, an artificial intelligence development framework usually consists of a front-end and a back-end. The front-end is used to provide programmers with a set of application programming interfaces (APIs) that are usually defined in an easier programming language (for example, Python). The application programming interfaces define available data types, such as tensors and arrays, and the following methods: how to define different layers, such as an input layer, an output layer, and hidden layers, as well as operations on each hidden layer; how to build the entire neural network by connecting different layers; classifier functions, and the like. The back-end is usually implemented in a more effective language (for example, C or C++). The back-end needs to implement all data types and methods defined in the application programming interfaces. At runtime, the front-end is linked to the back-end via a Python C/C++ extension or from a dynamic link library compiled by the back-end.

A compiler that supports artificial intelligence programs can be embedded in the artificial intelligence framework or can be a stand-alone executable file. Similar to normal program compilers, a compiler that supports artificial intelligence programs comprises a front-end and a back-end. In the compiler that supports artificial intelligence programs, the intermediate representation that compiles a computing job and is output from the front-end is usually a computation graph, not an intermediate representation program. The vertices (or nodes) of the computation graph define computations (often called kernels) in a neural network, and an edge between two vertices defines the dependency between two kernels. Generally, the compiler can perform some optimizations on the computation graph, for example, fusing several vertices into one, and so forth.

Back-end generated code of the compiler consists of two parts: a host code and a device code. The host code will be compiled, by a normal compiler (for example, GCC or LLVM), into a central processing unit executable file. This executable file is the same as an executable file in a normal program. It runs in a central processing unit and a main memory in a host computer. The host code is used for scheduling and coordination of kernel functions running in a dedicated processing unit device. The device code is generated for a target device and is compiled into a library by a vendor-specific compiler. The generated library will run on the target device which is attached to the host.

By way of example, if the target device is a dedicated processing unit of NVIDIA, the device code may be C/C++ code or PTX code of a CUD kernel function, each kernel function corresponding to a kernel operation defined in an intermediate representation computation graph. This code will be compiled by a vendor-specific compiler (for example, NVCC). The device code is implemented as a library and waits for calls from the host code.

A typical work flow of the host code may comprise: initializing a target dedicated processing unit device; reading in an intermediate representation computation graph; and selecting, for each computing node in paths of the computation graph, a corresponding CUDA kernel function from a device code library to implement the following: allocating memories for an input and an output of the kernel function, performing workspace memory allocation for the kernel function, duplicating input parameters of the kernel function from a central processing unit to a dedicated processing unit, calling the kernel function, executing the kernel function in the dedicated processing unit, duplicating an output of the kernel function from the dedicated processing unit back to the central processing unit, releasing the target dedicated processing unit device, outputting a computing result, and so on.

At present, technical solutions for improving the efficiency of processing a computing job based on parallel processing have been proposed. For example, input data to be processed may be divided into a plurality of groups, and the computing job may be executed in parallel by using a plurality of computing devices, so as to process input data of the plurality of groups at the same time. However, this technical solution cannot solve the problem that the computing job requires a large quantity of computing resources. Further, a technical solution for dividing a computing task included in a computing job into a plurality of sub-tasks has been proposed. However, the plurality of sub-tasks obtained from the division are executed in a serial manner, and therefore, computing resources in the computing system cannot be effectively used.

In order to at least partially solve one or more of the above problems and other potential problems, the example implementations of the present disclosure propose a technical solution for managing a computing job. This technical solution may divide a computing task involving a high computing resource requirement in a computing job into a plurality of sub-tasks based on a tile technology, and execute the plurality of sub-tasks in a parallel manner. With an example implementation of the present disclosure, the computing job can be processed in a more effective manner.

For ease of description, in the context of the present disclosure, various example implementations of the present disclosure will be described with a deep learning-based computing job as a specific example. It should be understood that although the details of example implementations of the present disclosure are described herein using only deep learning-based computing jobs as examples, it should be understood that the example implementations of the present invention may also be applicable to other jobs, such as deep learning-based computing jobs, high-performance computation (HPC)-based computing jobs, data mining-based computing jobs, and so on.

FIG. 1 schematically shows block diagram 100 of a computing system in which a schematic implementation of the present disclosure can be implemented. A plurality of servers, server 110-1, server 110-2, . . . , and server 110-M (hereinafter collectively referred to as server 110, where M is a natural number greater than 1) are deployed in computing system 100. Computing system 100 further comprises dedicated processing resource 160-1, dedicated processing resource 160-2, . . . , and dedicated processing resource 160-M (hereinafter collectively referred to as dedicated processing resource 160, where M is a natural number greater than 1). Each of servers 110 has one or more dedicated processing resources 160. Such a dedicated processing resource cluster or pool comprising a plurality of dedicated processing resource servers 160 is dynamic and shared.

In the example of FIG. 1, server 110-1 has dedicated processing resource 160-1, server 110-2 has dedicated processing resource 160-2, and server 110-M has dedicated processing resource 160-M. Examples of dedicated processing resource 160 may include, but are not limited to, a graphics processing unit, a field programmable gate array (FPGA), and the like. For ease of discussion, some example implementations will be described by using a graphics processing unit as an example of dedicated processing resource 160. In addition to dedicated processing resource 160, server 110 may further comprise one or more general-purpose processing units (not shown), such as a central processing unit.

FIG. 1 also shows a plurality of clients 120-1, 120-2, . . . , and 120-N (hereinafter collectively or individually referred to as client 120, where N is a natural number greater than 1), which have respective applications 150-1, 150-2, . . . , and 150-N (hereinafter collectively referred to as application 150, where N is a natural number greater than 1) to be run. Application 150 may be any application that may be run on a machine, and the application may be designed to execute corresponding jobs such as data processing or analysis. As an example, application 150 may execute computing jobs related to deep learning, machine learning or high-performance computing, artificial intelligence, and the like.

In order to run application 150 quickly and efficiently, client 120 may request dedicated processing resource 160 of server 110 to run the application 150. In such an implementation, client 120 may be connected to one or more servers 110 over Internet 130 and hand applications 150 to one or more dedicated processing resources 160 of server 110 to run. Depending on the interfaces supported by client 120, server 110, and/or dedicated processing resource 160, Internet 130 may support different types of wired or wireless connections based on various network transmission technologies such as Remote Direct Memory Access (RDMA) and Transmission Control Protocol (TCP).

It should be understood that the device and/or arrangement shown in FIG. 1 is only an example. In other examples, computing system 100 may include any suitable number of servers 110 and clients 120. Each of the servers 110 may be installed with any suitable number of dedicated processing resources 160, and each of clients 120 may have a plurality of applications 150 to be run. In addition, dedicated processing resource scheduling system 100 further comprises remote controller 140 and remote database 170.

Remote controller 140 may allocate dedicated processing resource 160 to client 120 based on the quantity of dedicated processing resources requested by client 120 and available dedicated processing resources in system 100. Then, client 120 may request allocated dedicated processing resource 160 from dedicated processing resource server 110. Remote database 170 can communicate with client 120 and remote controller 140 over Internet 130. Remote database 170 can store metadata extracted when client 120 compiles application 150, and the metadata can be acquired by remote controller 140. It should be understood that although controller 140 and remote database 170 are shown in FIG. 1 as separated, the two may also be implemented on the same device.

For clarity and brevity of description, an example implementation of the present disclosure will be described in detail by using a graphics processing unit as an example of dedicated processing resource 160. As known, the graphics processing unit, as a dedicated processor, derives its powerful computing power from its large number of kernels and high-bandwidth memory. In a graphics processing unit's hardware architecture, the graphics processing unit usually has a large number of graphics processing unit kernels, for example, several thousand or nearly ten thousand kernels.

The graphics processing unit kernel, as a dedicated processing resource, is the most basic processing unit, which is also known as streaming processor (SP). Instructions and jobs are ultimately processed in the graphics processing unit kernel. A plurality of graphics processing unit kernels execute instructions at the same time, thereby achieving parallel computing of the graphics processing unit. A plurality of streaming processors plus some other resources, such as registers and shared memories, can form a streaming multiprocessor.

However, it should be understood that the graphics processing unit is merely example dedicated processing resource 160 and is not intended to limit the scope of the present disclosure. The spirit and principle described herein can be applied to other dedicated processing resources, for example, processing resources in accelerators such as field programmable gate arrays, regardless of whether currently known or to be developed in the future, which are not limited to graphics processing unit kernels.

Figure 2:
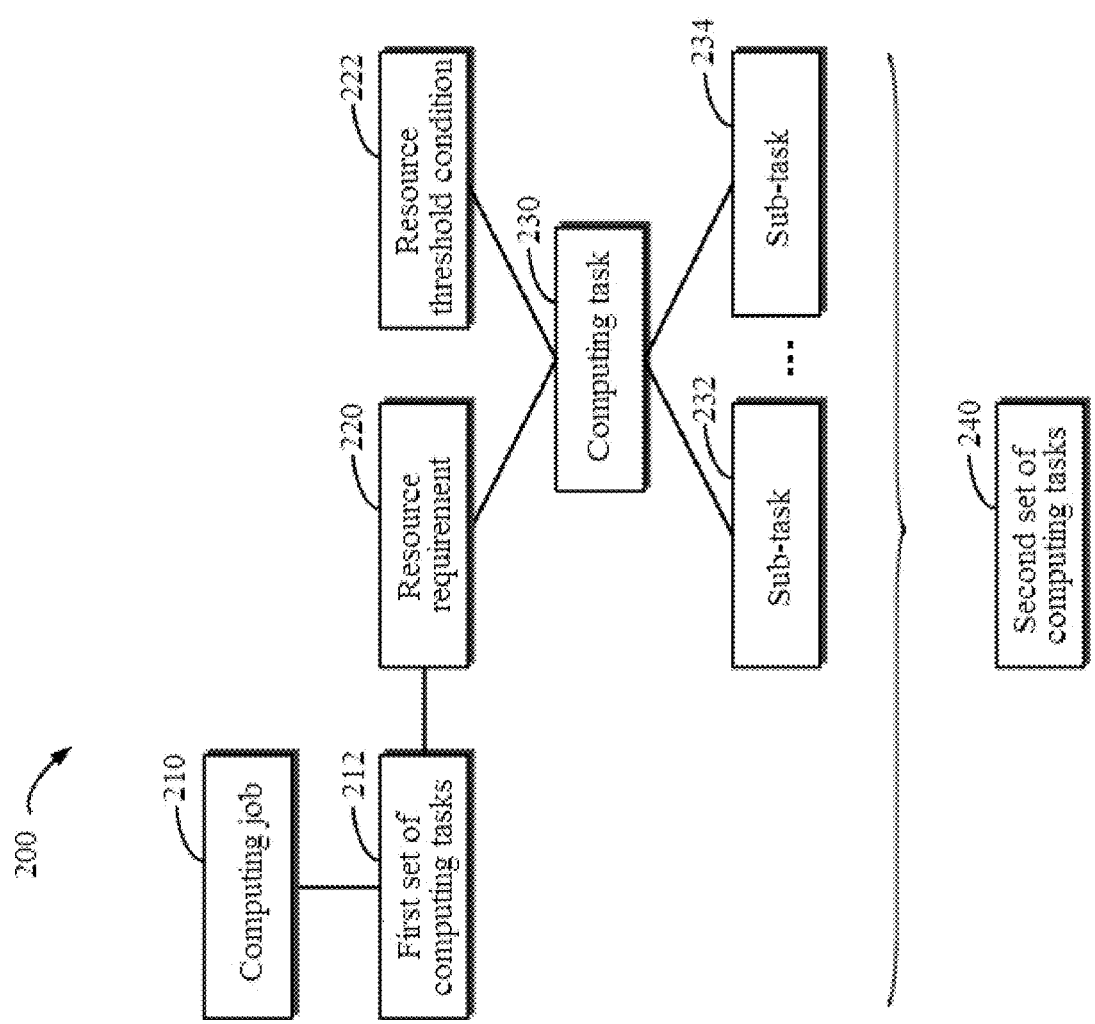
FIG. 2 schematically shows a block diagram of a process for processing a computing job according to an example implementation of the present disclosure.

Hereinafter, an outline of an example implementation of the present disclosure will be described first with reference to FIG. 2. FIG. 2 schematically shows block diagram 200 of a process for processing a computing job according to an example implementation of the present disclosure. As shown in FIG. 2, computing job 210 here may comprise a first set of computing tasks 212. According to an example implementation of the present disclosure, the concept of resource requirement 220 is proposed, and the resource requirement of each computing task in the first set of computing tasks 212 for a computing resource can be determined. By comparing each resource requirement with resource threshold condition 222, computing task 230 that has a high computing resource requirement in the first set of computing tasks 212 can be determined.

According to an example implementation of the present disclosure, the computing resource may comprise various aspects. For example, the computing resource may comprise a memory resource. If the computing resource provided by a computing device in a computing system cannot satisfy the requirement of computing task 230, data needs to be continuously exchanged between a memory and a storage device during the execution of computing task 230, resulting in a large amount of extra overhead for resource scheduling in the computing device. To alleviate the above problem and to improve the performance of the computing device, computing task 230 may be divided into a plurality of sub-tasks 232, . . . , and 234. Then, the generated plurality of sub-tasks 232, . . . , and 234 can be used to replace computing task 230, thereby determining a second set of computing tasks 240 of computing job 210. In this way, it can be ensured that the computing device can provide sufficient computing resources for each task and sub-task in the second set of computing tasks 240, thereby reducing the extra overhead of resource scheduling and improving the performance of processing the computing job.

With an example implementation of the present disclosure, by using a tile technology, computing task 230 involving a large amount of computation can be divided as uniformly as possible into a plurality of tasks requiring a similar small amount of computation. Therefore, the amount of computation required by computing task 230 can be distributed to a plurality of computing resources in a simpler and more effective manner, thereby facilitating the load balancing among the plurality of computing resources and improving the efficiency of processing computing task 230.

Figure 3:
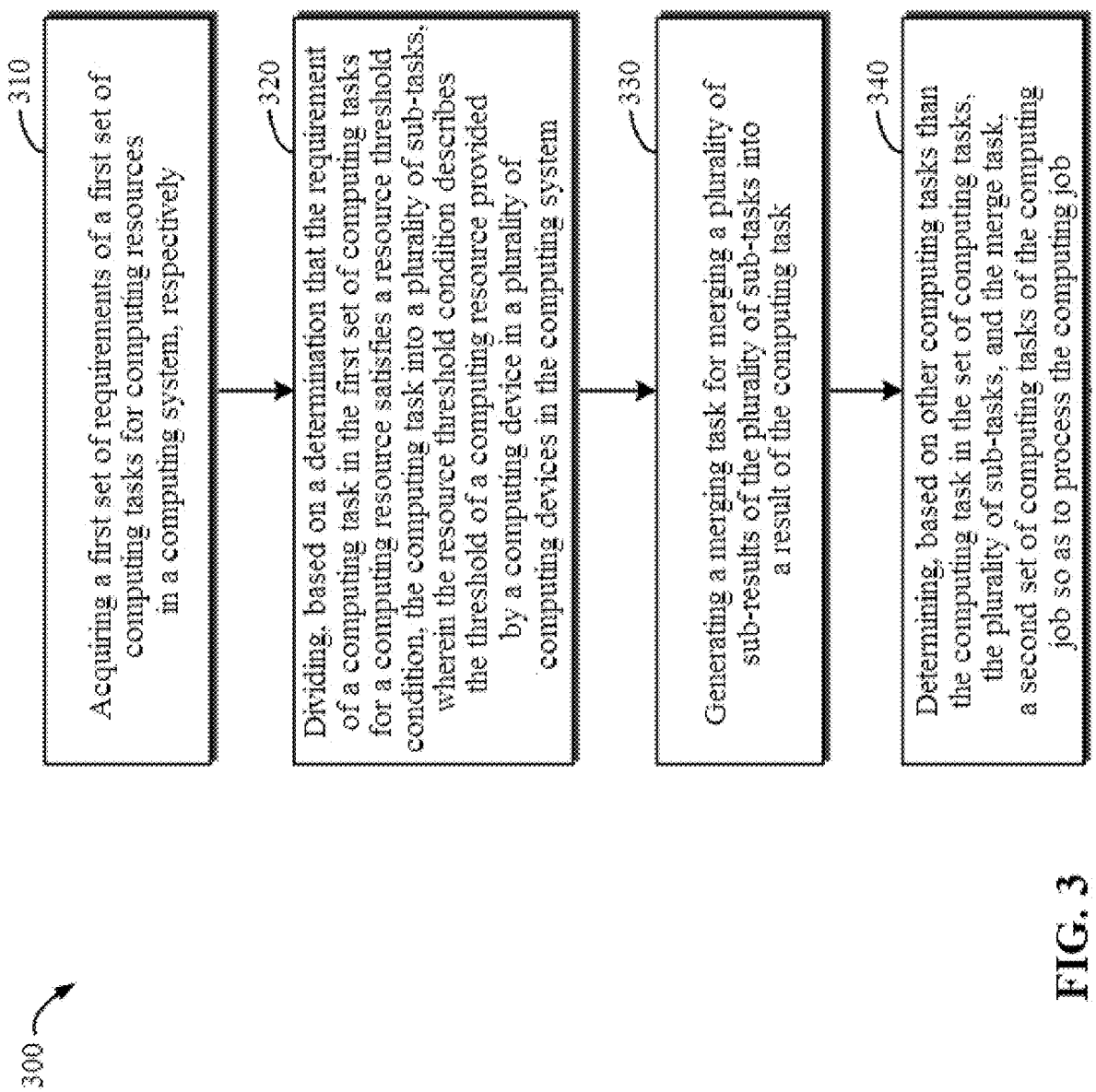
FIG. 3 schematically shows a flowchart of a method for processing a computing job according to an example implementation of the present disclosure.

Hereinafter, more details of an example implementation of the present disclosure will be described with reference to FIG. 3. FIG. 3 schematically shows a flowchart of method 300 for processing computing job 210 according to an example implementation of the present disclosure. It will be understood that computing job 210 may comprise a first set of computing tasks 212.

At block 310, a first set of requirements of the first set of computing tasks 212 for computing resources in a computing system is acquired, respectively. The requirement of each computing task for a computing resource can be acquired in a variety of ways. For example, a compiler can be used to determine a resource requirement. It will be understood that the first set of computing tasks 212 may include programs written in a programming language, may use a real compiler to perform compiling and obtain an executable program, and may read various computing resources (e.g., storage resources and thread resources) during the execution of the executable program.

For another example, resource requirements may be determined in a virtual manner. The operation of the real compiler can be modified so as to obtain a virtual program. The virtual program does not contain commands related to allocation and release of computing resources, but only records data related to the allocation and release of computing resources. In this way, the resource requirement of each computing task in the first set of computing tasks 212 can be obtained without actually executing the first set of computing tasks 212. Table 1 below schematically shows the obtained resource requirements of the first set of computing tasks 212.

TABLE 1

Resource requirements of computing tasks

| No. | Computing task identifier | Memory requirement (MB) | Thread requirement |
|---|---|---|---|
| 1 | fused_nn_conv2d | 604 | 2048 |
| 2 | fused_nn_conv2d_1 | 302 | 2048 |
| 3 | fused_nn_conv2d_2 | 151 | 2048 |
| 4 | fused_nn_conv2d_3 | 76 | 2048 |
| . . . | . . . | . . . | . . . |
| | fused_sqrt | 2 | 512 |

Table 1 schematically shows the requirements of a plurality of computing tasks sorted in accordance with resource requirements. The first column in Table 1 represents the serial numbers, the second column represents the identifiers of the computing tasks, the third column represents the memory requirements of the computing tasks, and the fourth column represents the requirements of the computing tasks for the numbers of threads. For example, the identifier of a computing task with a serial number of 1 is "fused_nn_conv2d." When executing this computing task, it is required to allocate 604 MB of memory space and to start 2,048 threads. In the context of the present disclosure, for convenience of description, only a memory resource is taken as an example of the computing resource. According to an example implementation of the present disclosure, the operations related to a thread resource are also similar, and thus will not be described again.

It will be understood that, although the performance of current computing devices has been greatly improved, there may still be situations where the computing resource of a computing device cannot satisfy the requirement of a computing task. For example, if a computing device can only provide a maximum of 160 MB of memory resources, since the computing task "fused_nn_conv2d" requires 604 MB of memory, the computing device cannot satisfy the requirement of the computing task. In this case, the computing task "fused_nn_conv2d" can be divided into a plurality of sub-tasks.

At block 320, it is determined whether the requirement of computing task 230 in the first set of computing tasks 212 for a computing resource satisfies a resource threshold condition. If the resource threshold condition is satisfied (that is, the requirement is higher than the maximum resource threshold), computing task 230 may be divided into a plurality of sub-tasks 232, . . . , and 234. It will be understood that the resource threshold condition describes the threshold of a computing resource provided by a computing device in a plurality of computing devices in a computing system. For example, the resource threshold condition can specify that the computing device can provide a maximum memory resource of 160 MB and a maximum number of threads of 512.

According to an example implementation of the present disclosure, processing may be performed for each computing task in the set of computing tasks 212. If the resource requirement of computing task 230 satisfies a threshold condition (that is, the requirement is higher than 160 MB), computing task 230 may be divided into a plurality of sub-tasks. If the resource requirement of a computing task does not satisfy a threshold condition (that is, the requirement is lower than 160 MB), no division operation is required. Referring to Table 1 above, the computing tasks "fused_nn_conv2d" and "fused_nn_conv2d_1" can be divided.

According to an example implementation of the present disclosure, the number of the plurality of sub-tasks may be determined according to the requirement of the computing task for the computing resource and the resource threshold condition. Then, the computing task can be divided into a plurality of sub-tasks according to the determined number. For the computing task "fused_nn_conv2d," the memory requirement of the computing task is 604 MB, but the resource threshold is 160 MB. In this case, the computing task needs to be divided into $$\left\lceil \frac{604}{160} \right\rceil = 4$$

sub-tasks. For the computing task "fused_nn_conv2d_1," the memory requirement of the computing task is 302 MB, but the resource threshold is 160 MB. In this case, the computing task needs to be divided into $$\left\lceil \frac{302}{160} \right\rceil = 2$$

sub-tasks.

Figure 4A:
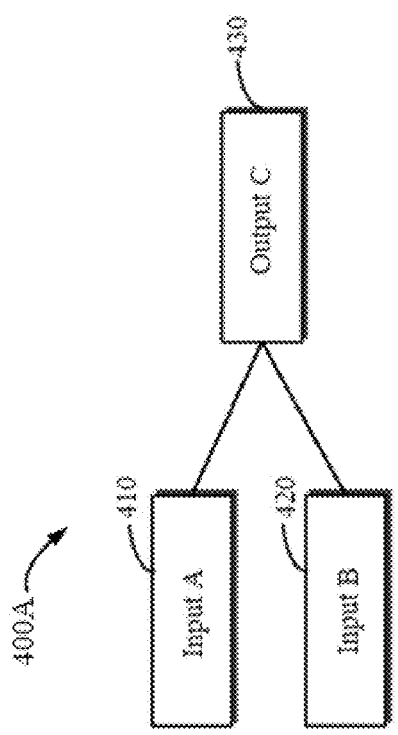
FIG. 4A schematically shows a block diagram of input data and output data of a computing task according to an example implementation of the present disclosure.

Computing task 230 can be divided into a plurality of sub-tasks in various ways. First, the input and output of computing task 230 are described with reference to FIG. 4A. FIG. 4A schematically shows block diagram 400A of input data and output data of computing task 230 according to an example implementation of the present disclosure. Generally speaking, the convolution operation in deep learning will involve a large amount of computation, so there may be a high requirement for computing resources. Thus, FIG. 4A describes more details of the present disclosure by taking inputs and outputs involved in the convolution operation as examples. It will be understood that computing task 230 may also involve operations other than the convolution operation, and inputs and outputs of other operations are similar to those shown in FIG. 4A, and thus will not be described again.

As shown in FIG. 4A, computing task 230 may comprise two inputs: input A 410 and input B 420. In a convolution operation, input A 410 represents the convolution kernel of the convolution operation, and input B 420 represents input data on which the convolution operation is to be performed. The convolution operation may be performed based on input A 410 and input B 420 to obtain a convolution result (i.e., output C 430).

Figure 4B:
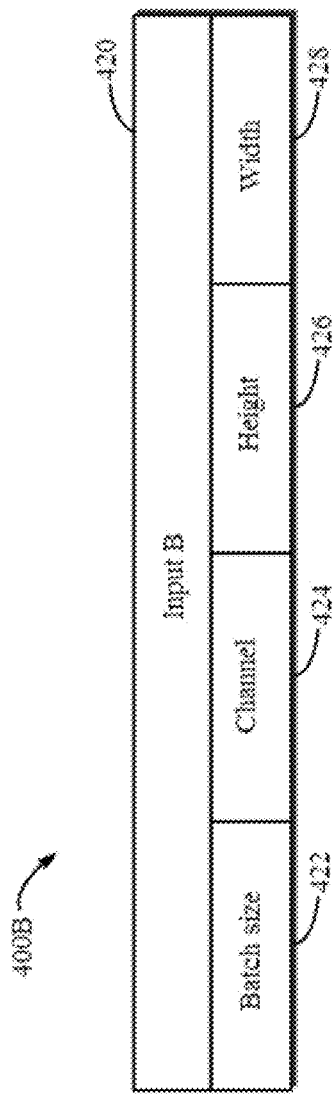
FIG. 4B schematically shows a block diagram of a format of input data according to an example implementation of the present disclosure.

It will be understood that input B 420 may be represented in the form of vectors. According to an example implementation of the present disclosure, an input data format of computing task 230 may be first acquired in order to determine in which manner computing task 230 is divided. FIG. 4B schematically shows block diagram 400B of a format of input data according to an example implementation of the present disclosure. As shown in FIG. 4B, input B 420 may include 4 dimensions: batch size 422, which is used to indicate the number of images in a batch to be processed; channel 424, which is used to indicate the number of channels of images to be processed; height 426, which is used to indicate the height of an image to be processed; and width 428, which is used to indicate the width of an image to be processed.

Figure 5:
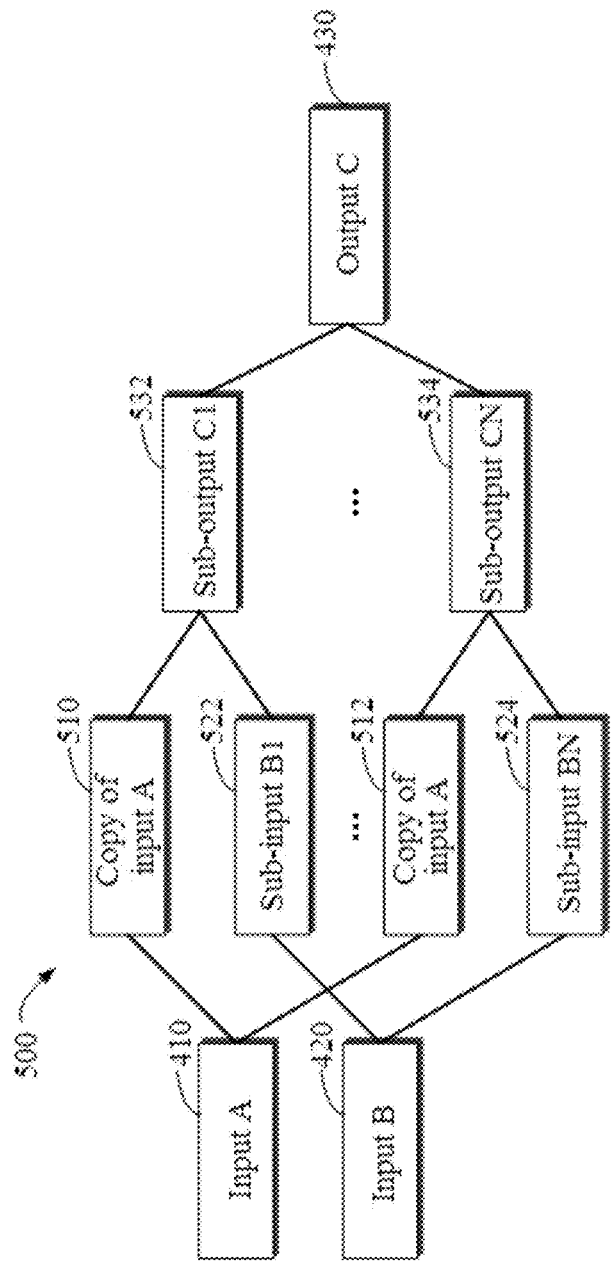
FIG. 5 schematically shows a block diagram of a process of dividing a computing task into a plurality of sub-tasks according to an example implementation of the present disclosure.

It will be understood that since the size of the convolution kernel is usually small (for example, 3×3), division may be performed only for input B 420 to be processed. According to an example implementation of the present disclosure, how to divide computing task 230 may be determined according to the acquired input data format. For example, since data in each channel is relatively independent, division can be performed according to channels. FIG. 5 schematically shows block diagram 500 of a process of dividing computing task 230 into a plurality of sub-tasks according to an example implementation of the present disclosure. Assuming that it is determined that computing task 230 needs to be divided into N sub-tasks, the format of input B can be divided into N parts according to channels: sub-input B1 522, . . . , and sub-input BN 524.

As shown in FIG. 5, N copies of input A 410 can be made to form copy 510, . . . , and copy 512 of input A. Further, a convolution operation may be performed based on copy 510 of input A and sub-input B1 522 to obtain sub-output C1 532, . . . , and a convolution operation may be performed based on copy 512 of input A and sub-input BN 524 to obtain sub-output CN 534. Hereinafter, how to divide a computing task into a plurality of sub-tasks based on channels will be described with reference to FIG. 6.

Figure 6:
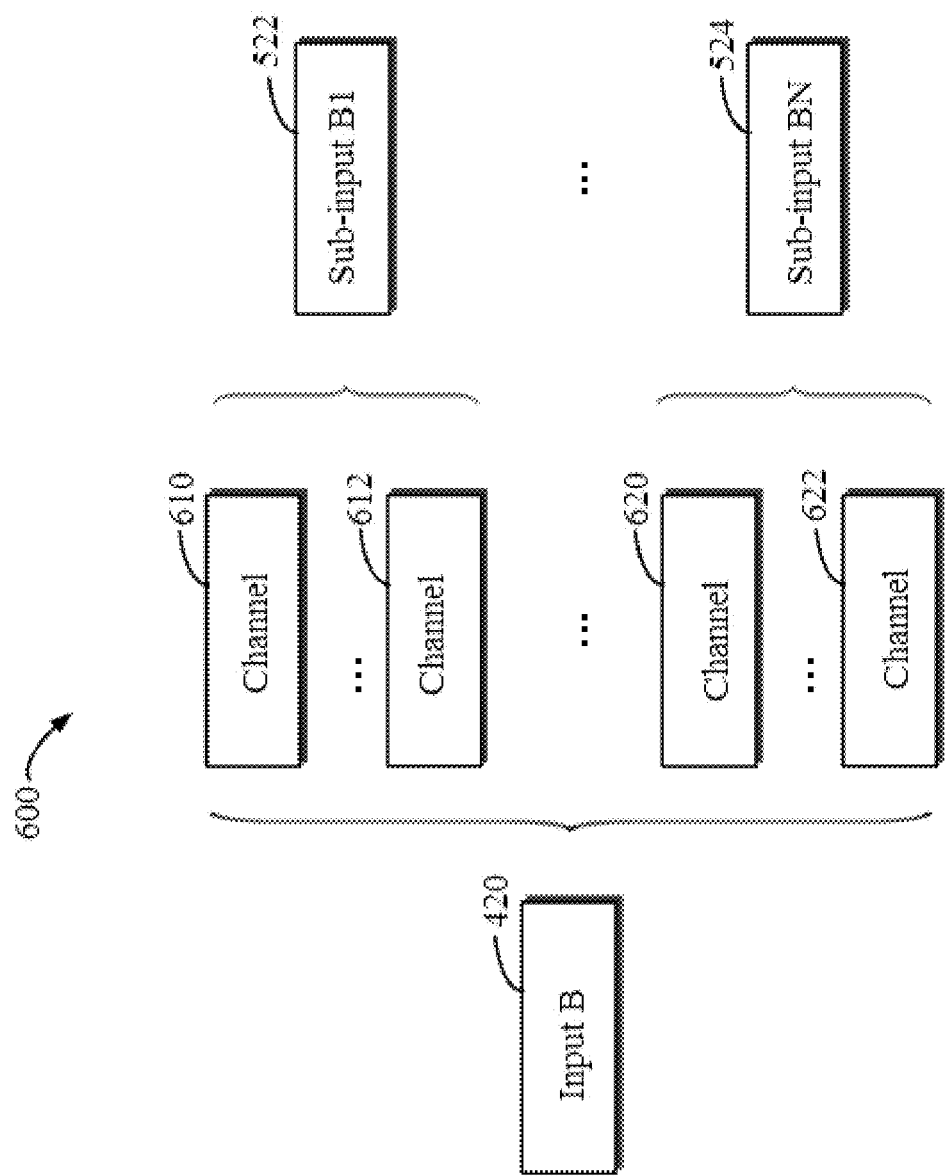
FIG. 6 schematically shows a block diagram of a process of dividing a computing task into a plurality of sub-tasks based on a plurality of channels of input data according to an example implementation of the present disclosure.

FIG. 6 schematically shows block diagram 600 of a process of dividing a computing task into a plurality of sub-tasks based on a plurality of channels of input data according to an example implementation of the present disclosure. All channels in input B 420 can be sorted. For example, input B 420 may include channel 610, . . . , channel 612, . . . , channel 620, . . . , channel 622. The number of channels included in each sub-input BI may be determined based on the number of channels and the number N of sub-tasks. For example, input B 420 may be divided into N sub-inputs: sub-input B1 522, . . . , and sub-input BN 524. In this case, sub-input B1 522 may include channel 610, . . . , and channel 612, and sub-input BN 524 may include channel 620, . . . , and channel 622. In this case, the format of sub-input Bi of a sub-task will be changed, and only data of part of the channels in original input B 420 will be included.

Specifically, for the above computing task "fused_nn_conv2d", the computing task may be divided into 4 sub-tasks (for example, respectively represented by identifiers "fused_nn_conv2d_sub01" to "fused_nn_conv2d_sub03"). Assuming that input data of the computing task includes 4 channels, then each sub-input can include only one channel. In this case, input data of the first sub-task includes input A 410 and the first channel of input B 420, input data of the second sub-task includes input A 410 and the second channel of input B 420, input data of the third sub-task includes input A 410 and the third channel of input B 420, and input data of the fourth sub-task includes input A 410 and the fourth channel of input B 420.

According to an example implementation of the present disclosure, computing task 230 may also be divided into a plurality of sub-tasks according to the resolution of input data. Generally speaking, when an image to be processed has a large resolution, an image format with a large resolution can be divided into a plurality of image formats with a smaller resolution. In this case, each of the sub-tasks obtained from the division processes only an image in a format with a smaller resolution.

According to an example implementation of the present disclosure, a resolution threshold condition may be utilized to represent a maximum resolution of an image that each computing task can process. If the resolution of an image in the input data satisfies the threshold condition, it means that the input image is too large and the resolution of the image can be reduced. For example, the resolution threshold (including height and width) can be defined as 512 pixels. If the resolution of the image in the input data is higher than 512×512, the image in the input data can be divided into a plurality of sub-images with a smaller resolution. If the resolution of the image in the input data is not higher than 512×512, the original resolution of the image can be maintained.

Figure 7:
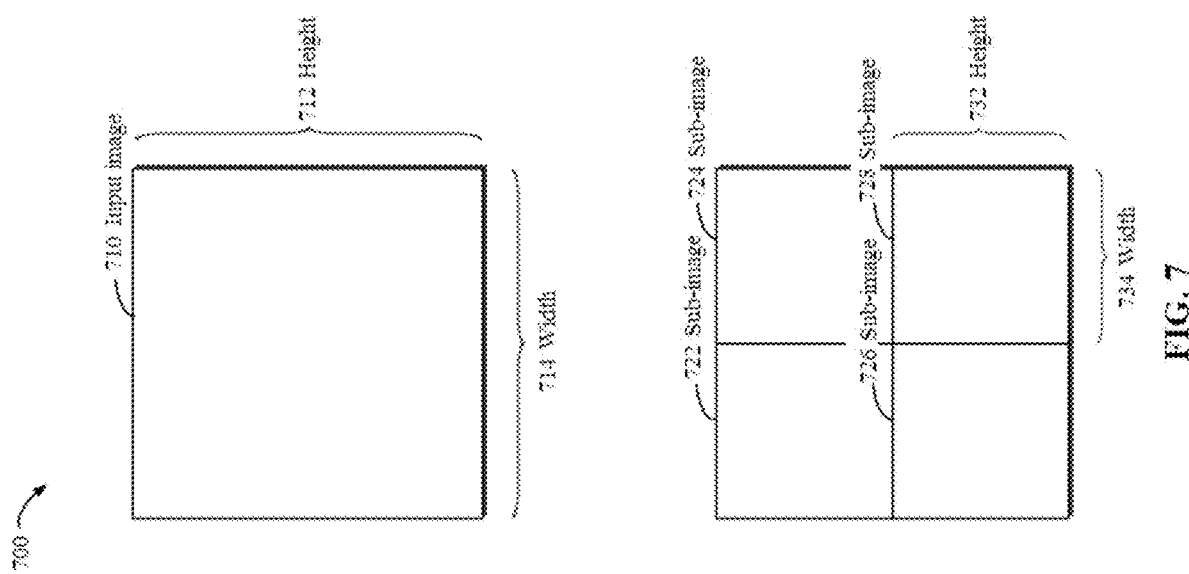
FIG. 7 schematically shows a block diagram of a process of dividing a computing task into a plurality of sub-tasks based on a resolution of input data according to an example implementation of the present disclosure.

According to an example implementation of the present disclosure, if it is determined that the resolution satisfies the resolution threshold condition, computing task 230 is divided into a plurality of sub-tasks according to the resolution. In this case, the resolution of input data B received by a sub-task will be changed to the resolution of the sub-image. Hereinafter, more details of performing the division according to the resolution will be described with reference to FIG. 7. FIG. 7 schematically shows block diagram 700 of a process of dividing a computing task into a plurality of sub-tasks based on the resolution of input data according to an example implementation of the present disclosure. As shown in FIG. 7, height 712 and width 714 of input image 710 are 1,024 pixels, respectively. In this case, the resolution of the input image is higher than a predetermined resolution threshold. In this case, the input data format is divided into a plurality of sub-formats according to the resolution. Input image 710 can be divided into four sub-images 722, 724, 726, and 728. In this case, height 732 and width 734 of each sub-image are 512 pixels, respectively, which satisfies the predetermined resolution threshold.

According to an example implementation of the present disclosure, a plurality of sub-tasks may be generated based on the plurality of sub-formats respectively, and a sub-task in the plurality of sub-tasks is used to perform convolution between input data in one of the plurality of sub-formats and the convolution kernel of the convolution operation to form a sub-result in a plurality of sub-results. For example, a sub-task may be generated to process sub-image 722, and the sub-task is used to perform convolution between sub-image 722 and the convolution kernel of the convolution operation to form a sub-result. For another example, a sub-task may be generated to process sub-image 724, and the sub-task is used to perform convolution between sub-image 724 and the convolution kernel of the convolution operation to form another sub-result. In a similar way, 4 sub-tasks can be generated respectively to process 4 sub-images located at different positions of the original image.

It will be understood that although example implementations of generating a plurality of sub-tasks respectively according to channels and according to the resolution are respectively described above by way of example, a plurality of sub-tasks may also be generated based on both channels and the resolution according to an example implementation of the present disclosure. For example, if the input data includes a large number of channels and the image has a large resolution, then a plurality of sub-tasks can be generated based on both the channels and the resolution.

Assume that the input data includes 4 channels, and the resolution of each image is 2048×2048. 4 sub-tasks can be obtained through division based on the channels, and each sub-task can process an image with a resolution of 2048×2048. In order to further reduce the resource requirement of each sub-task, each sub-task can be further divided based on the resolution. For example, the input image can be divided into 4 smaller input images of 1024×1024. After two divisions, 4×4=16 sub-tasks can be obtained.

It has been described above with reference to FIGS. 5 to 7 how to divide a computing task with a higher computing resource requirement into a plurality of sub-tasks. Hereinafter, referring back to FIG. 3, how to merge a plurality of sub-results from a plurality of sub-tasks will be described. As shown in FIG. 3, at block 330, a merging task for merging a plurality of sub-results of the plurality of sub-tasks into a result of the computing task is generated. It will be understood that since a sub-task processes only part of input data, the sub-result output by the sub-task includes only part of the final output data.

For example, for a case where the division is performed based on channels, sub-output C1 532 may include a processing result of processing part of the channels, . . . , and sub-output CN 534 may include a processing result of processing part of the channels. In this case, a merging task can be generated to merge the plurality of sub-results into final output C 430. According to an example implementation of the present disclosure, the merging task may sort the sub-results from the plurality of sub-tasks in the order of the channels, so as to obtain the final output of the computing task. A globally unique identifier can be set for the fusing task. For example, the fusing task can be represented as "fused_nn_conv2d_comb."

For another example, for a case where the division is performed based on the resolution, sub-output C1 532 may include a processing result of processing one region in the image, . . . , and sub-output CN 534 may include a processing result of processing one region in the image. In this case, a merging task can be generated to merge the plurality of sub-results into final output C 430. According to an example implementation of the present disclosure, the merging task may sort the sub-results from the plurality of sub-tasks according to the positions of various regions in the image, so as to merge the sub-results to obtain the final output of the computing task.

It will be understood that since computing task 230 having a large computing resource requirement has been divided into a plurality of sub-tasks having a smaller computing resource requirement, and a merging task for merging the plurality of sub-results from the plurality of sub-tasks has been generated, the plurality of sub-tasks and the merging task can be used to replace the original computing task having a high computing resource requirement. At block 340, based on other computing tasks than computing task 230 in the set of computing tasks 212, the plurality of sub-tasks, and the merging task, a second set of computing tasks 240 of computing job 210 can be determined so as to process computing job 210. With the example implementation of the present disclosure, the computing resource required by each computing task in the second set of computing tasks 240 is lower than the upper-limit resource threshold of the storage device. In this way, the computing device can provide sufficient computing resources to the computing task, thereby improving the efficiency of processing the computing task.

According to an example implementation of the present disclosure, a second set of computing tasks 240 is allocated to a plurality of computing devices according to the requirements of the second set of computing tasks 240 for computing resources. Table 2 below schematically shows the requirements of the second set of computing tasks 240 for computing resources.

TABLE 2

Resource requirements of computing tasks

| No. | Computing task identifier | Memory requirement (MB) | Thread requirement |
| --- | --- | --- | --- |
| 1 | fused_nn_conv2d_1 | 302 | 2048 |
| 2 | fused_nn_conv2d_sub01 | 151 | 2048 |
| 3 | fused_nn_conv2d_sub02 | 151 | 2048 |
| 4 | fused_nn_conv2d_sub03 | 151 | 2048 |
| 5 | fused_nn_conv2d_sub04 | 151 | 2048 |
| 6 | fused_nn_conv2d_2 | 151 | 2048 |
| 7 | fused_nn_conv2d_3 | 76 | 2048 |
| . . . | . . . | . . . | . . . |
|  | fused_nn_conv2d_comb | 2 | 512 |
|  | fused_sqrt | 2 | 512 |

In Table 2, the original computing task "fused_nn_conv2d" has been replaced with 4 sub-tasks "fused_nn_conv2d_sub01" to "fused_nn_conv2d_sub04" and a merging task "fused_nn_conv2d_comb." According to an example implementation of the present disclosure, the second set of computing tasks 240 may be divided into a plurality of sets of computing tasks according to the requirements of the second set of computing tasks 240 for computing resources and in accordance with a time dependency between computing tasks in the second set of computing tasks 240.

It will be understood that since computing tasks have their respective resource requirements, and there may also be a time dependency between two computing tasks, at this moment, the second set of computing tasks 240 can be divided into a plurality of sets by comprehensively considering the two factors so as to execute each computing task in a parallel manner as much as possible. Then, the plurality of sets may be allocated to the plurality of computing devices, respectively. With an example implementation of the present disclosure, on the one hand, the timing relationship among various computing tasks can be ensured, and on the other hand, parallel processing capabilities of a plurality of computing devices can also be utilized as much as possible. Compared with existing methods, the performance of processing computing job 210 can be improved.

Figure 8:
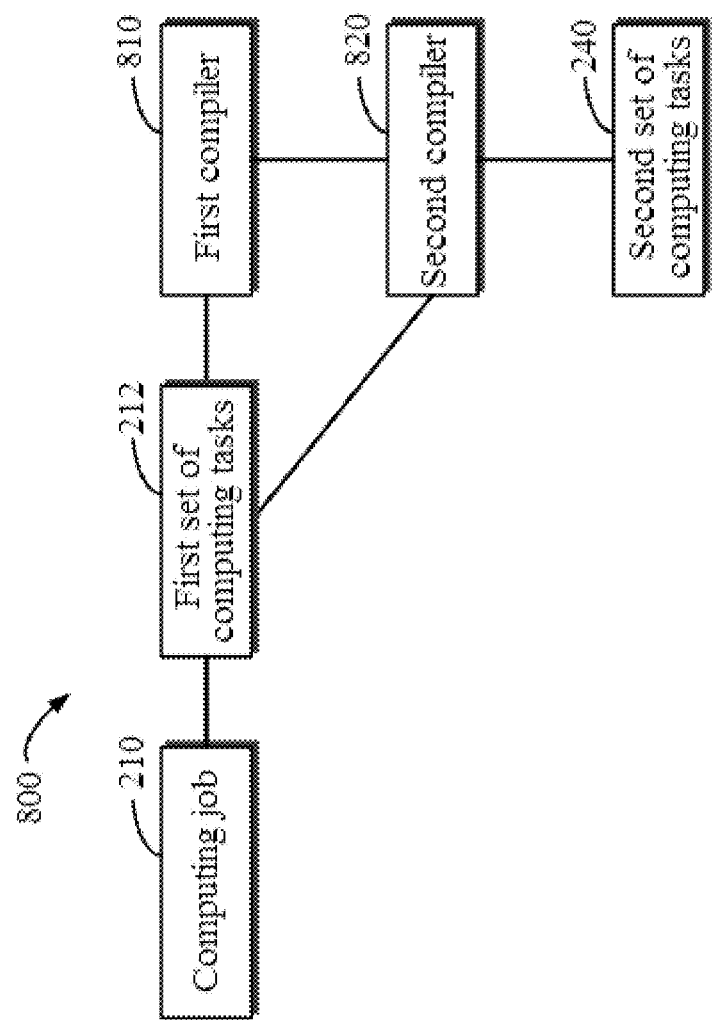
FIG. 8 schematically shows a block diagram of a process for processing a computing job by a compiler according to an example implementation of the present disclosure.

According to an example implementation of the present disclosure, method 300 described above may be implemented at a compiler for compiling a computing job into an executable program. Method 300 described above may be implemented by modifying the function of a compiler. FIG. 8 schematically shows block diagram 800 of a process for processing a computing job by a compiler according to an example implementation of the present disclosure. As shown in FIG. 8, first compiler 810 and second compiler 820 may be provided separately. First compiler 810 is used to acquire resource requirements of various computing tasks in a first set of computing tasks 212 included in computing job 210. For example, resource requirements can be acquired by modifying the function of an existing compiler without actually executing the compiled executable file.

The acquired resource requirements may be input to second compiler 820, and second compiler 820 here may implement the function of method 300 described above. Specifically, a computing task having a high computing resource requirement in the first set of computing tasks may be determined, and the computing task is divided into a plurality of sub-tasks that perform the same function. A merging task for merging a plurality of sub-results of the plurality of sub-tasks into a result of the computing task may be generated. Then, the plurality of sub-tasks and the merging task can be used to replace the computing task having a high computing resource requirement in the first set of computing tasks 212, and then a second set of computing tasks 240 can be obtained for processing computing job 210.

Further, second compiler 820 may compile the second set of computing tasks 240 into corresponding executable programs, so as to run the executable programs on various computing devices in the computing system. With an example implementation of the present disclosure, a large computing task with a high computing resource requirement can be divided into a plurality of small computing tasks, so that the computing resources of the computing device can satisfy the resource requirements of the divided small computing tasks. In this way, the overhead associated with frequently performing resource scheduling in a computing device can be reduced.

An example of the method according to the present disclosure has been described in detail above with reference to FIGS. 2 to 8, and implementations of a corresponding device will be described below. According to an example implementation of the present disclosure, a device for processing a computing job is provided, the computing job comprising a first set of computing tasks. The device comprises: an acquisition module configured to acquire a first set of requirements of the first set of computing tasks for computing resources in a computing system, respectively; a division module configured to divide, based on a determination that the requirement of a computing task in the first set of computing tasks for a computing resource satisfies a resource threshold condition, the computing task into a plurality of sub-tasks, the resource threshold condition describing the threshold of a computing resource provided by a computing device in a plurality of computing devices in the computing system; a generation module configured to generate a merging task for merging a plurality of sub-results of the plurality of sub-tasks into a result of the computing task; and a determination module configured to determine, based on other computing tasks than the computing task in the set of computing tasks, the plurality of sub-tasks, and the merging task, a second set of computing tasks of the computing job so as to process the computing job.

According to an example implementation of the present disclosure, the division module comprises: a number determination module configured to determine the number of a plurality of sub-tasks according to the requirement of a computing task for a computing resource and the resource threshold condition; and a task division module configured to divide the computing task into a plurality of sub-tasks based on the determined number.

According to an example implementation of the present disclosure, the task division module includes: a format acquisition module configured to acquire an input data format of a computing task, the input data format including at least a plurality of channels; and a channel division module configured to divide the computing task into a plurality of sub-tasks according to the plurality of channels.

According to an example implementation of the present disclosure, the computing task comprises a convolution operation, wherein the channel division module includes a sub-task determination module configured to determine, in the plurality of sub-tasks, a sub-task used to perform convolution between part of the plurality of channels and the convolution kernel of the convolution operation so as to form a sub-result in the plurality of sub-results.

According to an example implementation of the present disclosure, the task division module includes: a format acquisition module configured to acquire an input data format of a computing task, the input data format including at least a resolution of input data of the computing task; and a resolution division module configured to divide, based on a determination that the resolution satisfies a resolution threshold condition, the computing task into a plurality of sub-tasks according to the resolution.

According to an example implementation of the present disclosure, the computing task comprises a convolution operation, wherein the resolution division module is configured to include: a sub-format determination module configured to divide the input data format into a plurality of sub-formats according to the resolution; and a sub-task determination module configured to generate a plurality of sub-tasks respectively based on the plurality of sub-formats, a sub-task in the plurality of sub-tasks being used to perform convolution between input data in one of the plurality of sub-formats and the convolution kernel of the convolution operation so as to form a sub-result in the plurality of sub-results.

According to an example implementation of the present disclosure, the device further comprises: an allocation module configured to allocate a second set of computing tasks to a plurality of computing devices according to the requirements of the second set of computing tasks for computing resources.

According to an example implementation of the present disclosure, the allocation module includes: a set determination module configured to divide, according to the requirements of the second set of computing tasks for computing resources and in accordance with a time dependency between computing tasks in the second set of computing tasks, the second set of computing tasks into a plurality of sets of computing tasks; and a set allocation module configured to allocate the plurality of sets to the plurality of computing devices, respectively.

According to an example implementation of the present disclosure, the device is implemented at a compiler for compiling a computing job into an executable program.

According to an example implementation of the present disclosure, the requirement of a computing task for a computing resource comprises at least one of the following: a storage resource and a thread resource.

Figure 9:
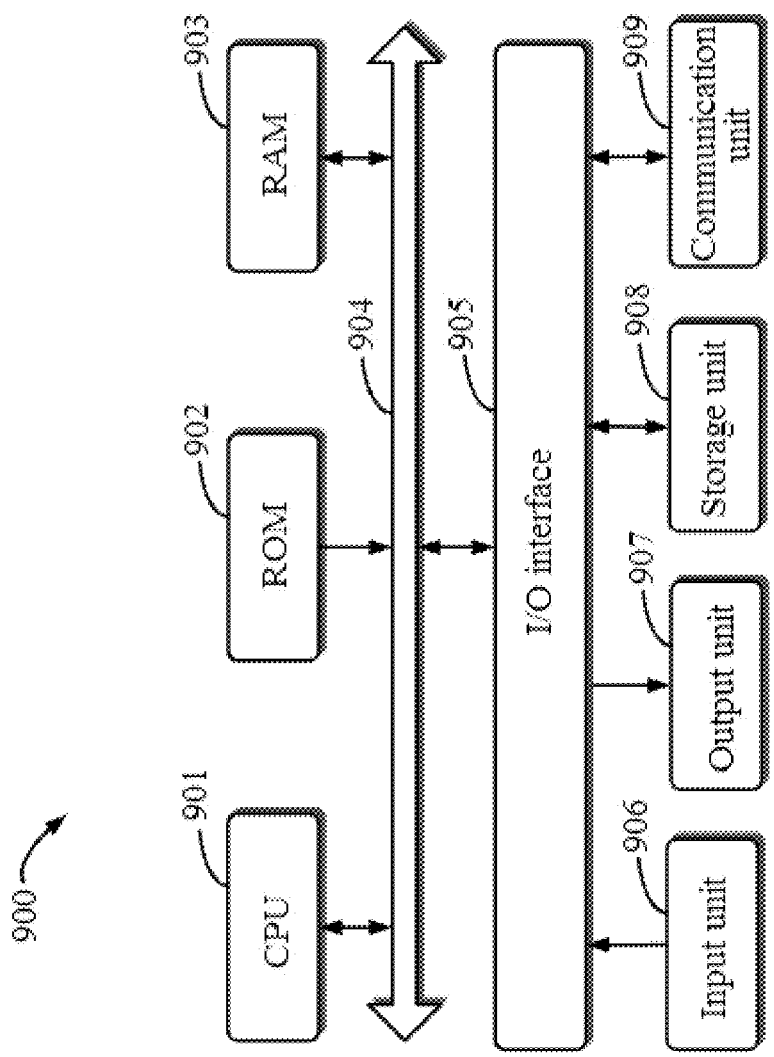
FIG. 9 schematically shows a block diagram of a device for processing a computing job according to an example implementation of the present disclosure.

FIG. 9 schematically shows a block diagram of device 900 for performing a job in an application system according to an example implementation of the present disclosure. As shown in the figure, device 900 comprises general processing unit (CPU) 901 that can perform various appropriate actions and processing according to computer program instructions stored in read-only memory (ROM) 902 or computer program instructions loaded into random access memory (RAM) 903 from storage unit 908. In RAM 903, various programs and data required for the operation of device 900 can also be stored. CPU 901, ROM 902, and RAM 903 are connected to each other via bus 904. Input/output (I/O) interface 905 is also connected to bus 904.

A plurality of components in device 900 are connected to I/O interface 905, including: input unit 906, e.g., a keyboard, a mouse, etc.; output unit 907, e.g., various types of displays, speakers, etc.; storage unit 908, e.g., a magnetic disk, an optical disk, etc.; and communication unit 909, e.g., a network card, a modem, a wireless communication transceiver, etc. Communication unit 909 allows device 900 to exchange information/data with other devices over a computer network such as the Internet and/or various telecommunication networks.

Various processes and processing described above, e.g., method 300, may be performed by processing unit 901. For example, in some implementations, method 300 may be implemented as a computer software program that is tangibly contained in a machine-readable medium, such as storage unit 908. In some implementations, some or all of the computer program may be loaded and/or installed on device 900 via ROM 902 and/or communication unit 909. When the computer program is loaded into RAM 903 and executed by CPU 901, one or more steps of method 300 described above may be performed. Alternatively, in other implementations, CPU 901 may also be configured in any other suitable manner to implement the above-mentioned processes/methods.

According to an example implementation of the present disclosure, an electronic device is provided, which comprises: at least one processor; and a memory coupled to the at least one processor and having instructions stored therein, wherein the instructions, when executed by the at least one processor, cause the device to perform actions for processing a computing job in an application system. The computing job comprises a first set of computing tasks. The actions comprise: acquiring a first set of requirements of the first set of computing tasks for computing resources in a computing system, respectively; dividing, based on a determination that the requirement of a computing task in the first set of computing tasks for a computing resource satisfies a resource threshold condition, the computing task into a plurality of sub-tasks, the resource threshold condition describing the threshold of a computing resource provided by a computing device in a plurality of computing devices in the computing system; generating a merging task for merging a plurality of sub-results of the plurality of sub-tasks into a result of the computing task; and determining, based on other computing tasks than the computing task in the set of computing tasks, the plurality of sub-tasks, and the merging task, a second set of computing tasks of the computing job so as to process the computing job.

According to an example implementation of the present disclosure, dividing the computing task into a plurality of sub-tasks comprises: determining the number of the plurality of sub-tasks according to the requirement of the computing task for the computing resource and the resource threshold condition; and dividing, according to the determined number, the computing task into the plurality of sub-tasks.

According to an example implementation of the present disclosure, dividing the computing task into the plurality of sub-tasks according to the determined number comprises: acquiring an input data format of the computing task, the input data format including at least a plurality of channels; and dividing, according to the plurality of channels, the computing task into the plurality of sub-tasks.

According to an example implementation of the present disclosure, the computing task comprises a convolution operation, wherein dividing the computing task into the plurality of sub-tasks according to the plurality of channels comprises: determining, in the plurality of sub-tasks, a sub-task used to perform convolution between part of the plurality of channels and the convolution kernel of the convolution operation so as to form a sub-result in a plurality of sub-results.

According to an example implementation of the present disclosure, dividing the computing task into the plurality of sub-tasks according to the determined number comprises: acquiring an input data format of the computing task, the input data format including at least a resolution of input data of the computing task; and dividing, based on a determination that the resolution satisfies a resolution threshold condition, the computing task into the plurality of sub-tasks according to the resolution.

According to an example implementation of the present disclosure, the computing task comprises a convolution operation, wherein dividing the computing task into the plurality of sub-tasks according to the resolution comprises: dividing the input data format into a plurality of sub-formats according to the resolution; and generating a plurality of sub-tasks based on the plurality of sub-formats respectively, a sub-task in the plurality of sub-tasks being used to perform convolution between input data of one of the plurality of sub-formats and the convolution kernel of the convolution operation so as to form a sub-result in the plurality of sub-results.

According to an example implementation of the present disclosure, the actions further comprise allocating the second set of computing tasks to the plurality of computing devices according to the requirements of the second set of computing tasks for computing resources.

According to an example implementation of the present disclosure, allocating the second set of computing tasks to the plurality of computing devices comprises: dividing, according to the requirements of the second set of computing tasks for computing resources and in accordance with a time dependency between computing tasks in the second set of computing tasks, the second set of computing tasks into a plurality of sets of computing tasks; and allocating the plurality of sets to the plurality of computing devices, respectively.

According to an example implementation of the present disclosure, the actions are implemented at a compiler for compiling the computing job into an executable program.

According to an example implementation of the present disclosure, the requirement of the computing task for the computing resource comprises at least one of the following: a storage resource and a thread resource.

According to an example implementation of the present disclosure, a computer program product is provided. The computer program product is tangibly stored in a non-transitory computer-readable medium and comprises machine-executable instructions for performing the method according to the present disclosure.

According to an example implementation of the present disclosure, a computer-readable medium is provided. The computer-readable medium stores machine-executable instructions that, when executed by at least one processor, cause the at least one processor to implement the method according to the present disclosure.

The present disclosure may be a method, a device, a system, and/or a computer program product. The computer program product may include a computer-readable storage medium on which computer-readable program instructions for implementing various aspects of the present disclosure are loaded.

The computer-readable storage medium may be a tangible device that can hold and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disk read-only memory (CD-ROM), a digital versatile disk (DVD), a memory stick, a floppy disk, a mechanical encoding device, such as a punch card or a protruding structure within a groove on which instructions are stored, and any suitable combination of the above. The computer-readable storage medium used herein is not to be interpreted as transient signals per se, such as radio waves or other freely propagated electromagnetic waves, electromagnetic waves propagated through waveguides or other transmission media (e.g., light pulses propagated through fiber optic cables), or electrical signals transmitted through electrical wires.

The computer-readable program instructions described herein can be downloaded from the computer-readable storage medium to various computing/processing devices, or downloaded to an external computer or an external storage device over a network, e.g., the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in the computer-readable storage medium in each computing/processing device.

Computer program instructions for performing the operations of the present disclosure may be assembly instructions, instruction set architecture (ISA) instructions, machine instructions, machine-related instructions, microcode, firmware instructions, state setting data, or source code or object code written in any combination of one or more programming languages. The programming languages include object-oriented programming languages, such as Smalltalk, C++, and the like, as well as conventional procedural programming languages, such as the "C" language or similar programming languages. The computer-readable program instructions can be completely executed on a user's computer, partially executed on a user's computer, executed as a separate software package, partially executed on a user's computer and partially executed on a remote computer, or completely executed on a remote computer or a server. In cases involving a remote computer, the remote computer can be connected to a user's computer over any kind of networks, including a local area network (LAN) or a wide area network (WAN), or it can be connected to an external computer (e.g., connected over the Internet using an Internet service provider). In some implementations, an electronic circuit (for example, a programmable logic circuit, a field-programmable gate array (FPGA), or a programmable logic array (PLA)) is customized by utilizing state information of computer-readable program instructions. The electronic circuit may execute the computer-readable program instructions, in order to implement various aspects of the present disclosure.

Various aspects of the present disclosure are described herein with reference to flowcharts and/or block diagrams of the method, apparatus (system), and computer program product according to the implementations of the present disclosure. It should be understood that each block of the flowcharts and/or block diagrams and combinations of blocks in the flowcharts and/or block diagrams can be implemented by computer-readable program instructions.

These computer-readable program instructions can be provided to a processing unit of a general-purpose computer, a special-purpose computer, or other programmable data processing apparatuses, thereby producing a machine, such that when these instructions are executed by the processing unit of the computer or other programmable data processing apparatuses, an apparatus for implementing the functions/actions specified in one or more blocks in the flowcharts and/or block diagrams is produced. These computer-readable program instructions may also be stored in a computer-readable storage medium, and these instructions cause a computer, a programmable data processing apparatus, and/or other devices to work in a specific manner. Therefore, the computer-readable medium storing the instructions includes an article of manufacture that includes instructions for implementing various aspects of the functions/actions specified in one or more blocks in the flowcharts and/or block diagrams.

The computer-readable program instructions can also be loaded onto a computer, other programmable data processing apparatuses, or other devices, so that a series of operating steps can be performed on the computer, other programmable data processing apparatuses, or other devices to produce a computer-implemented process. Therefore, the instructions executed on the computer, other programmable data processing apparatuses, or other devices can implement the functions/actions specified in one or more blocks in the flowcharts and/or block diagrams.

The flowcharts and block diagrams in the accompanying drawings show architectures, functions, and operations of possible implementations of the systems, methods, and computer program products according to a plurality of implementations of the present disclosure. In this regard, each block in the flowcharts or block diagrams may represent a module, a program segment, or part of instructions, which contains one or more executable instructions for implementing specified logical functions. In some alternative implementations, the functions marked in the blocks may also occur in an order different from those marked in the accompanying drawings. For example, two consecutive blocks may actually be executed substantially in parallel, and they may also sometimes be executed in a reverse order, depending on the functions involved. It should also be noted that each block in the block diagrams and/or flowcharts and the combinations of blocks in the block diagrams and/or flowcharts can be implemented with a dedicated hardware-based system that performs specified functions or actions, or with a combination of dedicated hardware and computer instructions.

Although various implementations of the present disclosure have been described above, the above description is illustrative rather than exhaustive, and is not limited to various implementations disclosed. Many modifications and variations will be apparent to a person of ordinary skill in the art without departing from the scope and spirit of the implementations described. The terms used herein are chosen to best explain the principles and practical applications of various implementations, or the improvements to technologies on the market, and otherwise to enable another person of ordinary skill in the art to understand various implementations disclosed herein.

What is claimed is:

1. A method for processing a computing job which comprises a first set of computing tasks using a plurality of computing devices in a computing system, the method comprising:
   acquiring, by a first compiler, a first set of requirements of the first set of computing tasks for computing resources, respectively, wherein the first compiler obtains a program corresponding to the first set of computing tasks which records data related to the allocation and release of computing resources without executing the first set of computing tasks;
   receiving, by a second compiler, the acquired first set of requirements from the first compiler;
   dividing, by the second compiler, based on a determination that the requirement of a given computing task in the first set of computing tasks for a computing resource satisfies a resource threshold condition, the given computing task into a plurality of sub-tasks, wherein the resource threshold condition describes the threshold of a computing resource provided by a computing device in the plurality of computing devices in the computing system;
   generating, by the second compiler, a merging task for merging a plurality of sub-results of the plurality of sub-tasks into a result of the given computing task;
   replacing, by the second compiler, the given computing task in the first set of computing tasks with the plurality of sub-tasks and the merging task to obtain a second set of computing tasks of the computing job;
   allocating the second set of computing tasks to the plurality of computing devices according to the requirements of the second set of computing tasks for the computing resources; and
   causing execution, by the plurality of computing devices, of the allocated second set of computing tasks compiled into corresponding executable programs by the second compiler so as to process the computing job;

wherein allocating the second set of computing tasks to the plurality of computing devices comprises:
dividing the second set of computing tasks into a plurality of sets of computing tasks according to the requirements of the second set of computing tasks for the computing resources and in accordance with a time dependency between computing tasks in the second set of computing tasks to utilize parallel processing capabilities of the plurality of computing devices; and
allocating the plurality of sets of computing tasks to the plurality of computing devices, respectively, so as to enable execution of at least a subset of the computing tasks of plurality of sets of computing tasks in a parallel manner.

2. The method of claim 1, wherein dividing the given computing task into the plurality of sub-tasks comprises:
determining the number of the plurality of sub-tasks according to the requirement of the given computing task for the computing resource and the resource threshold condition; and
dividing the given computing task into the plurality of sub-tasks according to the determined number.

3. The method of claim 2, wherein dividing the given computing task into the plurality of sub-tasks according to the determined number comprises:
acquiring an input data format of the given computing task, wherein the input data format comprises at least a plurality of channels; and
dividing the given computing task into the plurality of sub-tasks according to the plurality of channels.

4. The method of claim 3, wherein the given computing task comprises a convolution operation, and dividing the given computing task into the plurality of sub-tasks according to the plurality of channels comprises:
determining, in the plurality of sub-tasks, a sub-task used to perform convolution between part of the plurality of channels and a convolution kernel of the convolution operation to form a sub-result in the plurality of sub-results.

5. The method of claim 2, wherein dividing the given computing task into the plurality of sub-tasks according to the determined number comprises:
acquiring an input data format of the given computing task, wherein the input data format comprises at least a resolution of input data of the given computing task; and
dividing, based on a determination that the resolution satisfies a resolution threshold condition, the given computing task into the plurality of sub-tasks according to the resolution.

6. The method of claim 5, wherein the given computing task comprises a convolution operation, and dividing the given computing task into the plurality of sub-tasks according to the resolution comprises:
dividing the input data format into a plurality of sub-formats according to the resolution; and
generating the plurality of sub-tasks based on the plurality of sub-formats respectively, a sub-task in the plurality of sub-tasks being used to perform convolution between input data in one of the plurality of sub-formats and a convolution kernel of the convolution operation to form a sub-result in the plurality of sub-results.

7. The method of claim 1, wherein the requirement of the given computing task for the computing resource comprises at least one of the following: a storage resource and a thread resource.

8. An electronic device, comprising:
at least one processor; and
a memory coupled to the at least one processor and having instructions stored therein, wherein the instructions, when executed by the at least one processor, cause the electronic device to perform actions for processing a computing job using a plurality of computing devices operatively connected to the electronic device in a computing system, the computing job comprising a first set of computing tasks, and the actions comprising:
acquiring, by a first compiler, a first set of requirements of the first set of computing tasks for computing resources, respectively, wherein the first compiler obtains a program corresponding to the first set of computing tasks which records data related to the allocation and release of computing resources without executing the first set of computing tasks;
receiving, by a second compiler, the acquired first set of requirements from the first compiler;
dividing, by the second compiler, based on a determination that the requirement of a given computing task in the first set of computing tasks for a computing resource satisfies a resource threshold condition, the given computing task into a plurality of sub-tasks, wherein the resource threshold condition describes the threshold of a computing resource provided by a computing device in the plurality of computing devices in the computing system;
generating, by the second compiler, a merging task for merging a plurality of sub-results of the plurality of sub-tasks into a result of the given computing task;
replacing, by the second compiler, the given computing task in the first set of computing tasks with the plurality of sub-tasks and the merging task to obtain a second set of computing tasks of the computing job;
allocating the second set of computing tasks to the plurality of computing devices according to the requirements of the second set of computing tasks for the computing resources; and
causing execution, by the plurality of computing devices, of the allocated second set of computing tasks compiled into corresponding executable programs by the second compiler so as to process the computing job;
wherein allocating the second set of computing tasks to the plurality of computing devices comprises:
dividing the second set of computing tasks into a plurality of sets of computing tasks according to the requirements of the second set of computing tasks for the computing resources and in accordance with a time dependency between computing tasks in the second set of computing tasks to utilize parallel processing capabilities of the plurality of computing devices; and
allocating the plurality of sets of computing tasks to the plurality of computing devices, respectively, so as to enable execution of at least a subset of the computing tasks of plurality of sets of computing tasks in a parallel manner.

9. The electronic device of claim 8, wherein dividing the given computing task into the plurality of sub-tasks comprises:
determining the number of the plurality of sub-tasks according to the requirement of the given computing task for the computing resource and the resource threshold condition; and
dividing the given computing task into the plurality of sub-tasks according to the determined number.

10. The electronic device of claim 9, wherein dividing the given computing task into the plurality of sub-tasks according to the determined number comprises:

acquiring an input data format of the given computing task, wherein the input data format comprises at least a plurality of channels; and dividing the given computing task into the plurality of sub-tasks according to the plurality of channels.

11. The electronic device of claim 10, wherein the given computing task comprises a convolution operation, and dividing the given computing task into the plurality of sub-tasks according to the plurality of channels comprises:

determining, in the plurality of sub-tasks, a sub-task used to perform convolution between part of the plurality of channels and a convolution kernel of the convolution operation to form a sub-result in the plurality of sub-results.

12. The electronic device of claim 9, wherein dividing the given computing task into the plurality of sub-tasks according to the determined number comprises:

acquiring an input data format of the given computing task, wherein the input data format comprises at least a resolution of input data of the given computing task; and dividing, based on a determination that the resolution satisfies a resolution threshold condition, the given computing task into the plurality of sub-tasks according to the resolution.

13. The electronic device of claim 12, wherein the given computing task comprises a convolution operation, and dividing the given computing task into the plurality of sub-tasks according to the resolution comprises:

dividing the input data format into a plurality of sub-formats according to the resolution; and generating the plurality of sub-tasks based on the plurality of sub-formats respectively, a sub-task in the plurality of sub-tasks being used to perform convolution between input data in one of the plurality of sub-formats and a convolution kernel of the convolution operation to form a sub-result in the plurality of sub-results.

14. A computer program product tangibly stored on a non-transitory computer-readable medium and containing machine-executable instructions, wherein the machine-executable instructions are used to perform steps for processing a computing job using a plurality of computing devices in a computing system, the computing job comprising a first set of computing tasks, and the steps comprising:

acquiring, by a first compiler, a first set of requirements of the first set of computing tasks for computing resources, respectively, wherein the first compiler obtains a virtual program corresponding to the first set of computing tasks which records data related to the allocation and release of computing resources without executing the first set of computing tasks;

receiving, by a second compiler, the acquired first set of requirements from the first compiler;

dividing, by the second compiler, based on a determination that the requirement of a given computing task in the first set of computing tasks for a computing resource satisfies a resource threshold condition, the given computing task into a plurality of sub-tasks, wherein the resource threshold condition describes the threshold of a computing resource provided by a computing device in the plurality of computing devices in the computing system;

generating, by the second compiler, a merging task for merging a plurality of sub-results of the plurality of sub-tasks into a result of the given computing task;

replacing, by the second compiler, the given computing task in the first set of computing tasks with the plurality of sub-tasks and the merging task to obtain a second set of computing tasks of the computing job;

allocating the second set of computing tasks to the plurality of computing devices according to the requirements of the second set of computing tasks for the computing resources; and causing execution, by the plurality of computing devices, of the allocated second set of computing tasks compiled into corresponding executable programs by the second compiler so as to process the computing job;

wherein allocating the second set of computing tasks to the plurality of computing devices comprises:

dividing the second set of computing tasks into a plurality of sets of computing tasks according to the requirements of the second set of computing tasks for the computing resources and in accordance with a time dependency between computing tasks in the second set of computing tasks to utilize parallel processing capabilities of the plurality of computing devices; and allocating the plurality of sets of computing tasks to the plurality of computing devices, respectively, so as to enable execution of at least a subset of the computing tasks of plurality of sets of computing tasks in a parallel manner.

15. The computer program product of claim 14, wherein dividing the given computing task into the plurality of sub-tasks comprises:

determining the number of the plurality of sub-tasks according to the requirement of the given computing task for the computing resource and the resource threshold condition; and dividing the given computing task into the plurality of sub-tasks according to the determined number.

16. The computer program product of claim 15, wherein dividing the given computing task into the plurality of sub-tasks according to the determined number comprises:

acquiring an input data format of the given computing task, wherein the input data format comprises at least a plurality of channels; and dividing the given computing task into the plurality of sub-tasks according to the plurality of channels.

17. The computer program product of claim 16, wherein the given computing task comprises a convolution operation, and dividing the given computing task into the plurality of sub-tasks according to the plurality of channels comprises:

determining, in the plurality of sub-tasks, a sub-task used to perform convolution between part of the plurality of channels and a convolution kernel of the convolution operation to form a sub-result in the plurality of sub-results.

* * * * *